US010815991B2

(12) United States Patent
Kowalski et al.

(10) Patent No.: US 10,815,991 B2
(45) Date of Patent: Oct. 27, 2020

(54) DUAL INPUT PUMP AND SYSTEM

(71) Applicant: Stackpole International Engineered Products, Ltd., Mississauga (CA)

(72) Inventors: Andrzej Kowalski, Toronto (CA); Richard Muizelaar, Mississauga (CA)

(73) Assignee: STACKPOLE INTERNATIONAL ENGINEERED PRODUCTS, LTD., Mississauga (CA)

( * ) Notice: Subject to any disclaimer, the term of this patent is extended or adjusted under 35 U.S.C. 154(b) by 185 days.

(21) Appl. No.: 15/691,418

(22) Filed: Aug. 30, 2017

(65) Prior Publication Data

US 2018/0066655 A1    Mar. 8, 2018

Related U.S. Application Data

(60) Provisional application No. 62/383,160, filed on Sep. 2, 2016.

(51) Int. Cl.
*F04C 15/00* (2006.01)
*F04C 11/00* (2006.01)
(Continued)

(52) U.S. Cl.
CPC ............ *F04C 15/008* (2013.01); *F04C 2/102* (2013.01); *F04C 11/001* (2013.01); *F04C 14/02* (2013.01);
(Continued)

(58) Field of Classification Search
CPC ..... F04C 11/001; F04C 11/003; F04C 11/005; F04C 11/006; F04C 15/008; F04C 15/061;
(Continued)

(56) References Cited

U.S. PATENT DOCUMENTS 3,244,111 A    4/1966   Shelhart
4,501,536 A    2/1985   Middlekauff
(Continued)

OTHER PUBLICATIONS

Written Opinion of the International Searching Authority and International Search Report PCT/IB2017/055227 dated Dec. 18, 2017.
(Continued)

*Primary Examiner* — Kenneth J Hansen
(74) *Attorney, Agent, or Firm* — Pillsbury Winthrop Shaw Pittman, LLP

(57) ABSTRACT

A dual input fluid pump system for coupling to a transmission or an engine and an electrical motor is disclosed. The system may include a first external gear, vane, internal gear, or gerotor-type pump, a second external gear pump, and connecting shaft. Gears of the second pump include one-way clutch bearings that enable operation of the system in multiple modes including engine-only; motor-only; a combined mode where the engine operates the first pump via the shaft and the motor operates the second pump with an external gear rotating in its pumping direction at a rate greater than the shaft; inlet boost; and a disconnection mode. Also noted is a pump that has a first shaft for coupling the engine to a first external gear and a second shaft for coupling the motor to a second external gear, as well as a one-way clutch bearing that performs in a similar manner.

12 Claims, 10 Drawing Sheets

(51) Int. Cl.
*F16H 61/00* (2006.01)
*F04C 2/10* (2006.01)
*F04C 14/02* (2006.01)
*F04C 15/06* (2006.01)

(52) U.S. Cl.
CPC .......... *F04C 15/0061* (2013.01); *F04C 15/06* (2013.01); *F16H 61/0031* (2013.01); *F04C 2240/40* (2013.01); *F04C 2240/50* (2013.01)

(58) Field of Classification Search
CPC ...... F04C 15/0061; F04C 14/02; F16D 47/04; Y10S 903/913; F04B 35/01; F16H 61/0031
USPC .......................................................... 417/247
See application file for complete search history.

(56) References Cited

U.S. PATENT DOCUMENTS

| | | | |
|---|---|---|---|
| 4,519,755 A | 5/1985 | Hanson | |
| 4,586,885 A | 5/1986 | Middlekauff | |
| 4,639,202 A | 1/1987 | Mahanay et al. | |
| 5,474,428 A * | 12/1995 | Kimura | F16H 57/0439 192/48.92 |
| 5,799,744 A | 9/1998 | Yamaguchi et al. | |
| 5,951,421 A | 9/1999 | D'Herripon | |
| 6,350,108 B1 | 2/2002 | Haupt | |
| 6,454,543 B1 | 9/2002 | Beck et al. | |
| 6,579,070 B1 | 6/2003 | Birkenmaier et al. | |
| 6,634,866 B2 | 10/2003 | Vukovich et al. | |
| 6,799,109 B2 | 9/2004 | Nakamori et al. | |
| 7,008,200 B2 | 3/2006 | Holtzapple et al. | |
| 7,186,101 B2 | 3/2007 | Holtzapple et al. | |
| 7,494,439 B2 | 2/2009 | Pashnik et al. | |
| 7,726,959 B2 | 6/2010 | Holtzapple et al. | |
| 8,042,331 B2 | 10/2011 | Schultz et al. | |
| 8,182,235 B2 | 5/2012 | Morgan, Jr. | |
| 8,231,359 B2 | 7/2012 | Merz et al. | |
| 8,561,502 B2 | 10/2013 | Schultz | |
| 8,640,452 B2 | 2/2014 | Schultz et al. | |
| 8,714,942 B2 | 5/2014 | Lutoslawski et al. | |
| 8,753,099 B2 | 6/2014 | Holtzapple et al. | |
| 8,784,073 B2 | 7/2014 | Nomura et al. | |
| 8,795,118 B2 | 8/2014 | Hideg et al. | |
| 8,821,138 B2 | 9/2014 | Holtzapple et al. | |
| 8,826,760 B2 | 9/2014 | Feldt et al. | |
| 9,046,102 B2 | 6/2015 | Nagamura et al. | |
| 9,108,499 B2 | 8/2015 | Long et al. | |
| 9,109,597 B2 * | 8/2015 | Bowing | F04C 2/344 |
| 9,353,743 B2 | 5/2016 | Ehrhardt et al. | |
| 9,360,010 B2 | 6/2016 | Ehrhardt et al. | |
| 9,382,872 B2 | 7/2016 | Holtzapple et al. | |
| 9,534,519 B2 | 1/2017 | Valkenberg | |
| 9,534,683 B2 | 1/2017 | Takehana | |
| 9,670,924 B2 | 6/2017 | Holtzapple et al. | |
| 2009/0041593 A1 | 2/2009 | Yokoi et al. | |
| 2009/0232673 A1 | 9/2009 | Reisch et al. | |
| 2011/0129359 A1 | 6/2011 | Hawkins | |
| 2011/0237388 A1 | 9/2011 | Koenig et al. | |
| 2012/0251354 A1 | 10/2012 | Kogure | |
| 2013/0098468 A1 | 4/2013 | Brittan et al. | |
| 2014/0003987 A1 * | 1/2014 | Martin-Dye | F04C 11/001 418/1 |
| 2014/0056732 A1 | 2/2014 | Wang et al. | |
| 2014/0158345 A1 | 6/2014 | Jang et al. | |
| 2014/0190455 A1 | 7/2014 | Ootsuki | |
| 2015/0377344 A1 | 12/2015 | Fujikawa | |
| 2016/0052379 A1 | 2/2016 | Inoue et al. | |
| 2017/0058895 A1 * | 3/2017 | Schultz | F04C 15/0073 |
| 2017/0211572 A1 | 7/2017 | Jeong et al. | |
| 2017/0306950 A1 | 10/2017 | Ehringer et al. | |

OTHER PUBLICATIONS

International Preliminary Report on Patentability dated Mar. 14, 2019 issued in corresponding International Patent Application No. PCT/IB2017/055227.

Supplementary European Search Report dated Dec. 6, 2019 issued in corresponding EP Application No. 17845633.1 (8 pages).

* cited by examiner

MODE 1 - ICE ONLY

MODE 2 - MOTOR ONLY

MODE 3 - COMBINED

MODE 4 - INLET BOOST

MODE 5

| Roller Clutch Numbers | Boundary Dimensions (mm) | | | Torque Capacities (N·m) | Mass (g) approx. | Mass (g) approx. | Matching Support Needle Roller Bearing Numbers | |
|---|---|---|---|---|---|---|---|---|
| | $F_w$ | D | $C_{-0.25}^{0}$ | | | | Full Complement | With Cage |
| FC-4K(') | 4 | 8 | 6 | 0.31 | 0.90 | 12 | F-48 | - |
| FC-6 | 6 | 10 | 12 | 2.45 | 4.1 | 14 | F-68 | FJ-69 |
| FC-6K(') | 6 | 10 | 12 | 1.96 | 2.7 | 14 | F-68 | FJ-69 |
| FCL-8K(') | 8 | 12 | 12 | 3.24 | 3.3 | 18 | F-810 | FJ-810 |
| FC-8 | 8 | 14 | 12 | 4.02 | 6.8 | 20 | FH-810 | FHF-810 |

DUAL INPUT PUMP AND SYSTEM

CROSS REFERENCE TO RELATED APPLICATION

This application claims priority to U.S. Provisional Patent Application No. 62/383,160, filed Sep. 2, 2016, which is hereby incorporated by reference in its entirety herein.

BACKGROUND

Field

The present disclosure is generally related to a pump having dual inputs, and, in particular, to a pump and system having one-way clutch bearings associated with gears for operating in different modes.

Description of Related Art

Pumps are used in a number of applications to pump fluids or lubricants (such as oil) to vehicular systems, for example. Some known pumps may be driven by either an internal combustion engine or an electric motor. Such pumps have been known to use clutches that are external to the pump to connect one of these drives. U.S. Pat. Nos. 5,474,428 and 5,799,744 shows such concepts, for example, both of which are incorporated herein in their entirety.

SUMMARY

One aspect of this disclosure provides a dual input fluid pump system for coupling to a transmission or an internal combustion engine power source and an electrical motor power source. The pump system includes a first pump and a second pump. The first pump has a housing, a rotatable pumping element rotatably mounted in the housing, an inlet, an outlet, and an input shaft for coupling the transmission or the internal combustion engine power source to the rotatable pumping element thereof for rotating the rotatable pumping element in a pumping direction to pump fluid from the inlet to the outlet through the housing. The second pump is an external gear pump that has a housing, at least first and second intermeshed external gears rotatably mounted in the housing, an inlet, an outlet, and an input shaft for coupling the electrical motor power source to the second external gear thereof for rotating the gears in counter-rotating pumping directions to pump fluid from the inlet to the outlet through the housing. A connecting shaft is provided between the rotatable pumping element of the first pump and the first external gear of the second pump. The connecting shaft is rotated in the pumping direction of the rotatable pumping element of the first pump as rotated by the transmission or the internal combustion engine power source. Each of the external gears of the second pump includes a one-way clutch bearing therein. The one way clutch bearing of the first external gear of the second pump receives the connecting shaft and is configured to (a) transmit rotation of the connecting shaft to the first external gear of the second pump for rotation in the pumping direction thereof, and (b) prevent rotation of the first external gear of the second pump in the pumping direction thereof from being transmitted to the connecting shaft. The one-way clutch bearing of the second external gear of the second pump receives the input shaft thereof and is configured to (a) transmit rotation of the input shaft of the second pump to the second external gear of the second pump for rotation in the pumping direction thereof, and (b) prevent rotation of the second external gear of the second pump in the pumping direction thereof from being transmitted to the input shaft of the second pump. Further, the one-way clutches enable the pump system to be operated in at least three modes including (a) an engine-only mode in which the transmission or the engine operates the first pump via the input shaft of the first pump and the second pump via the connecting shaft between the rotatable pumping element of the first pump and the first external gear of the second pump, (b) a motor-only mode in which the motor only operates the second pump, and (c) a combined mode in which the transmission or the engine operates the first pump via the input shaft and the motor operates the second pump with the first external gear thereof rotating in its pumping direction at a rate greater than the connecting shaft.

Another aspect provides a dual input fluid pump for coupling to a transmission or an internal combustion engine power source and an electrical motor power source. The pump includes a housing, at least first and second intermeshed external gears rotatably mounted in the housing, an inlet, an outlet, a first input shaft for coupling the transmission or the internal combustion engine power source to the first external gear for rotating the gears in counter-rotating pumping directions to pump fluid from the inlet to the outlet through the housing; and a second input shaft for coupling the electrical motor power source to the second external gear for also rotating the gears in the counter-rotating pumping directions to pump fluid from the inlet to the outlet through the housing. Each of the external gears of the second pump includes a one-way clutch bearing therein. The one way clutch bearing of the first external gear receives the first input shaft and is configured to (a) transmit rotation of the first input shaft to the first external gear for rotation in the pumping direction thereof, and (b) prevent rotation of the first external gear in the pumping direction thereof from being transmitted to the first input shaft. The one-way clutch bearing of the second external gear receives the second input shaft thereof and is configured to (a) transmit rotation of the second input shaft to the second external gear for rotation in the pumping direction thereof, and (b) prevent rotation of the second external gear in the pumping direction thereof from being transmitted to the second input shaft. Further, the one-way clutches enable the pump to be operated in at least three modes including (a) an engine-only mode in which the transmission or the engine operates the pump via the first input shaft, (b) a motor-only mode in which the motor operates the pump via the second input shaft, and (c) an overdrive mode in which the motor operates the pump via the second input shaft at a faster rate than the first input shaft is being rotated by the transmission or the engine.

Other aspects, features, and advantages of the present disclosure will become apparent from the following detailed description, the accompanying drawings, and the appended claims.

DETAILED DESCRIPTION OF THE PREFERRED EMBODIMENT(S)

As detailed herein, the disclosed system relates to utilizing two inputs (or a "dual input") to drive pump(s) for the displacement of an amount of fluid in a number of different modes. The ability to adjust an amount of pump displacement may be beneficial in certain applications, such as hybrid vehicles that utilize both an engine and electric motor or a start-stop system. The disclosed system can also utilize an automatic transmission in place of an engine. As understood by one of ordinary skill in the art, "pump displacement" or "displacement" as used throughout this disclosure refers to a volume of fluid or liquid (lubricant) a pump is capable of moving during a specified period of time, i.e., a flow rate.

Figure 1:
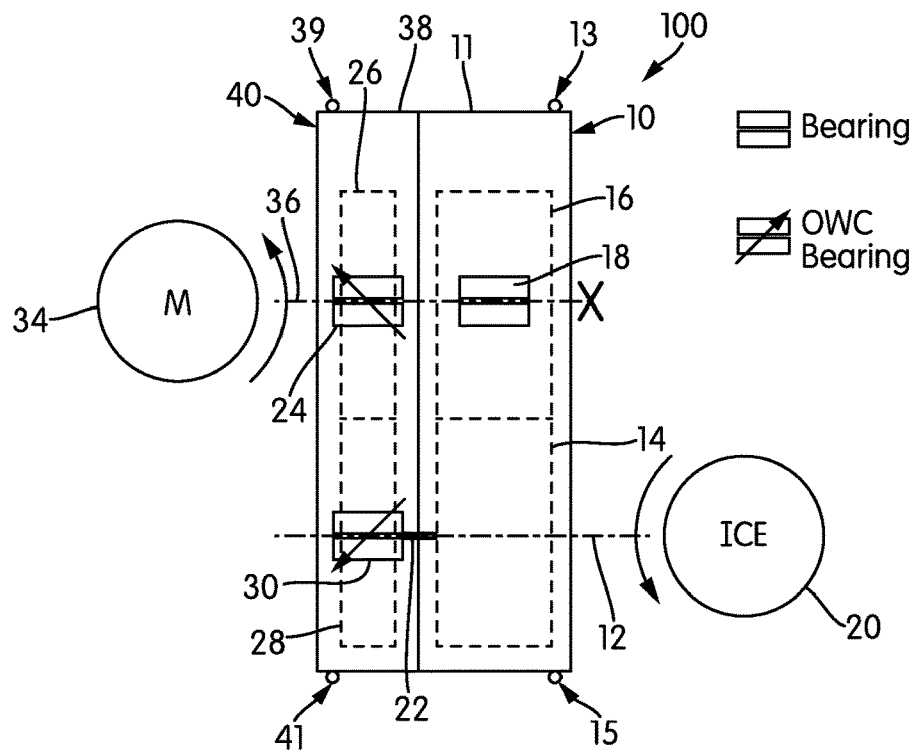
FIG. 1 is a schematic illustration of a dual input fluid pump system in accordance with one embodiment of this disclosure.
Figure 2:
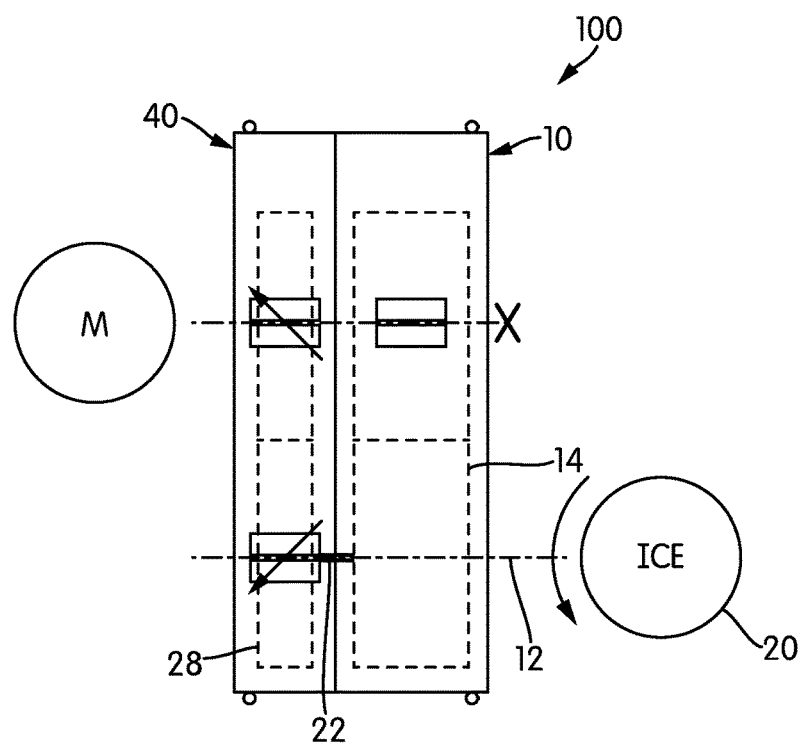
FIG. 2 is a schematic illustration of the system of FIG. 1 operating in a first mode in accordance with an embodiment.

FIG. 1 illustrates a schematic diagram of a dual input fluid pump system 100 (or assembly) in accordance with an embodiment. The pump system 100 includes a first pump 10 and a second pump 40. The pump system 100 is coupled to both a power source 20 and an electrical motor power source 34. In one embodiment, the power source 20 is an internal combustion engine (ICE). For example, as depicted schematically in FIG. 1, the first pump 10 is configured to be driven directly by the internal combustion engine power source 20 and the second pump 40 is configured to be driven directly by the electrical motor power source 34. In some cases, the internal combustion engine (ICE) power source 20 may also be referred to as an internal combustion generator (ICG).

For purposes of this disclosure, for simplicity and explanatory purposes only, power source 20 is shown and described as an internal combustion engine (ICE or ICG). However, in an alternate embodiment, the power source 20 may be an automatic transmission. In one embodiment, the transmission can be driven by the internal combustion engine, which may, in some cases, drive the pump system 100. It should be understood, then, that the internal combustion engine may be directly or indirectly coupled to the pump system 100 to directly or indirectly (e.g., via a transmission) drive the first pump 10. The internal combustion engine power source 20 may be a direct connection to a power output of the internal combustion engine, or an indirect connection, such as via a belt, chain, gear system, or other intervening components. Similarly, the electric motor power source 34 may be a direct connection to a power output of the electric motor, or an indirect connection also/alternatively. Also, the transmission, engine and/or motor may each be one of the systems that receive an output flow of oil from the pump system.

Both pumps 10 and 40 include rotatable pumping elements inside their respective pump housings, described in greater detail below. In one embodiment, both pumps 10 and 40 are external gear pumps, with external gears being provided as the rotatable pumping elements. In another embodiment, at least one of pumps 10 and 40 is a gerotor-type pump (e.g., see FIG. 8A, later described below), having a gerotor unit acting as a rotatable pumping element. In yet another embodiment, at least one of pumps 10 and 40 is an internal gear pump (also described later). In one embodiment, both pumps 10 and 40 are internal gear pumps. In still yet another embodiment, a variable vane pump (e.g., a positive displacement pump) may be used as pump 10 and/or pump 40. In an embodiment, first pump 10 may be a gerotor-type pump and second pump 40 may be an external gear pump. In another embodiment, first pump 10 may be a variable vane pump and second pump 40 may be an external gear pump. In an embodiment, first pump 10 may be a gerotor-type pump and second pump 40 may be an internal gear pump. In another embodiment, first pump 10 may be a variable vane pump and second pump 40 may be an internal gear pump. In yet another embodiment, one of pumps 10 and 40 may be an internal gear pump and the other may be an external gear pump. The combination and types of pumps noted herein are exemplary only and not intended to be limiting.

In the exemplary embodiment illustrated in FIG. 1, pump 10 has an intermeshed external drive gear 14 and an external driven gear 16 rotatably mounted within a housing 11. The pump housing 11 has an inlet 13 and an outlet 15. The inlet 13 receives fluid or inputs lubricant to be pumped (typically oil in the automotive context) from a source (e.g., sump) into the housing 11, and the outlet 15 is used for discharging or delivering the pressurized fluid or lubricant to a designated system from the housing 11. The rotation and meshing of the gears 14, 16 moves and displaces fluid to the outlet 15 of the pump 10. An input shaft 12 is connected to the drive gear 14 and couples the internal combustion engine (ICE) power source 20 to the drive gear 14. The ICE source 20 is configured to rotate the shaft 12 which in turn rotates drive gear 14 to rotate driven gear 16. The gears 14, 16 are rotated in counter-rotating pumping directions to pump fluid from the inlet 13 to the outlet 15 through the housing 11. Driven gear 16 includes a bearing 18 that assists in its rotation (e.g., about a shaft) by reducing friction.

Pump 40 also has intermeshed external gears 26 and 28 rotatably mounted within a second housing 38. The pump housing 38 has an inlet 39 and an outlet 41. The inlet 39 receives fluid or inputs lubricant to be pumped from a source (e.g., sump) into the housing 38, and the outlet 41 is used for discharging or delivering the pressurized fluid or lubricant to a designated system from the housing 38. In an embodiment, the inlet and outlet 13 and 15 of pump 10 may be independent from inlet and outlet 39 and 41 of pump 40; i.e., the inlets and outlets may be fluidly independent in that feed to and/or from the pumps 10 and 40 is not associated with a common source. In another embodiment, the inlet and outlet 13 and 15 of pump 10 may be separate from inlet and outlet 39 and 41 of pump 40 but not fluidly independent; i.e., the inlets and/or outlets may have a common circuit source or sump. For example, a common source inlet that separately directs fluid or lubricant to inlet 13 and inlet 39 may reduce complexity of passages and inlet filter connections. In one embodiment, the inlet 39 receives fluid or lubricant from a source or sump. In another embodiment, the inlet 39 receives input fluid or lubricant from outlet 15 of pump 10.

In an embodiment, separate outlets may be necessary if there are two pressure circuits associated with the pump system 100. For example, one outlet may be used to support a high pressure clutch actuation circuit, while the other outlet may be used to support a low pressure lubricant and cooling circuit. In one embodiment, the outlet 41 (or outlet circuit) of pump 40 may be used to boost an inlet circuit associated with pump 10. Alternatively, the outlet circuits may be separate. In one embodiment, described in greater detail later below with reference to FIG. 5, the outlet 41 of pump 40 may be used to boost inlet 13 of pump 10.

The configuration of the inlets and outlets of the pumps (as independent or separate from one another) may depend upon packaging constraint(s) and system design. Accordingly, the configuration and connection of the inlets and outlets of the pumps 10, 40 are not intended to be limiting herein.

The rotation and meshing of the gears 26, 28 of pump 40 moves and displaces fluid to the outlet 41 of the pump 40. A connecting shaft 22 is provided between the drive gear 14 of the first pump 10 and the gear 28 of the second pump 40, such that the rotation of the drive gear 14 also rotates the shaft 22 and thus may be used to drive the gear 28. The connecting shaft 22 is rotated in the same pumping direction of the external drive gear 14 (as rotated by the ICE source 20). The second pump 40 also has an input shaft 36 that is connected to the gear 26 and couples the electrical motor power source (M) 34 to the gear 26. In some modes, the motor source 34 is configured to rotate the shaft 36 which in turn rotates gear 26 to rotate gear 28. The gears 26, 28 are rotated in counter-rotating pumping directions to pump fluid from the inlet 39 to the outlet 41 through the housing 38.

It is noted that the number of teeth of the gears in each of the pumps is not intended to be limiting. The number of teeth on the gears 14, 16 and/or 26, 28 may be adjusted to accommodate noise issues or space constraints, for example. In one embodiment, the gears in each pump have a 1:1 ratio; that is, gears 14 and 16 have the same number of teeth, and gears 26 and 28 have the same number of teeth. The gears 14, 16 may have the same number of teeth as gears 26, 28 in an embodiment. In one embodiment, the gears 14, 16 (which have the same number of teeth) have a different number of teeth as compared to gears 26, 28 (which have the same number of teeth). In another embodiment, the gears 14, 16 and/or 26, 28 may include different numbers of teeth in each of the pumps.

In accordance with an embodiment, the connecting shaft 22 for connecting gear 14 of the first pump 10 and gear 28 of the second pump 40 and the input shaft 12 are each sections of a common shaft. In another embodiment, the shafts 12 and 22 may be separate and distinct components.

In one embodiment, the motor input shaft 36 (or another connecting shaft) is provided between gears 26 and 16. However, gears 26 and 16 are both not rotatable by this shaft. Instead, bearing 18 of driven gear 16 in first pump 10 allows for the driven gear 16 to rotate about (or relative to) such a shaft freely in both rotational directions, so that this shaft simply acts as a guide and/or stabilizer for assembly of the gears in the system.

Each of the external gears 26, 28 of the second pump 40 includes a one-way clutch bearing therein. Gear 26 includes a first one-way clutch bearing 24 and gear 28 includes a second one-way clutch bearing 30. The one-way clutch bearing 30 receives the connecting shaft 22 that is connected to the drive gear 14. The one-way clutch bearing 30 is configured to both (a) transmit rotation of the connecting shaft 22 to the external gear 28 of the second pump 40 for rotation in the pumping direction thereof (which is the same rotational pumping direction as gear 14 of the first pump 10), and (b) prevent rotation of the external gear 28 in the pumping direction from being transmitted to the connecting shaft 22 (thereby preventing rotation of the motor 34). That is, the one-way clutch bearing 30 transfers rotation from the connecting shaft 22 to the external gear 28 in its pumping direction, but does not transfer rotation of the external gear 28 back to the shaft 22. The one-way clutch bearing 24 of the external gear 26 receives the input shaft 36 of the motor source 34. Bearing 24 functions the same as bearing 30, but is arranged in the opposite manner. Thus, bearing 24 is configured to both (a) transmit rotation of the motor input shaft 36 to the external gear 26 of the second pump 40 for rotation in the pumping direction thereof, and (b) prevent rotation of the external gear 26 in the pumping direction thereof from being transmitted to the input shaft 36 of the second pump 40.

Further, the one-way clutch bearings 24 and 30 enable the pump system 100 to possibly be operated in different modes—e.g., (1) an engine-only mode, (2) a motor-only mode, (3) a combined mode, (4) an inlet boost mode (optional), and (5) a disconnection mode (optional). Use of all these modes is not necessary and the description thereof should not be considered limiting.

FIGS. 2-6 illustrate features related to each mode (1), (2), (3), (4), and (5). In the system's engine-only mode, depicted in FIG. 2, the ICE source 20 acts as a primary drive to drive both pumps 10 and 40. For example, it may be desirable to downsize the overall pump displacement from the system 100, i.e., to reduce power loss when driving the pump, by using an engine-only mode in order to reduce losses in a driving cycle and at higher speeds. The electric drive motor source 34 is off and not running. The ICE source 20 rotates the input shaft 12 of the first pump 10 to rotate gear 14 (thus driving gear 16, which freely rotates on its bearing 18) and operates the second pump 40 via rotating the connecting shaft 22 between gears 14 and 28, and specifically by one-way bearing 30 transferring rotation of shaft 22 to gear 28. Thus, gears 14 and 28 are rotating at the same rate together in the same pumping direction, and gears 16 and 26 are driven in the opposite pumping direction by their respective intermeshed gear teeth. The one-way bearing 24 allows driven gear 26 to rotate in its pumping direction freely over shaft 36 without back-driving against the electric motor power source 34. Displacement from both pumps 10, 40 is proportional to the drive speed of the ICE source 20.

Figure 3:
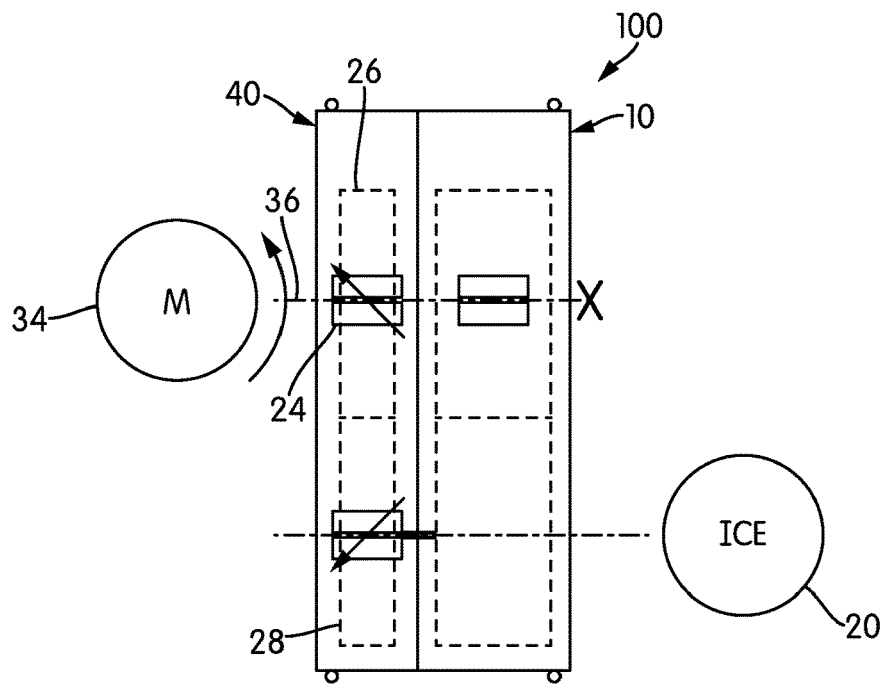
FIG. 3 is a schematic illustration of the system of FIG. 1 operating in a second mode in accordance with an embodiment.

FIG. 3 schematically illustrates the motor-only mode of operating system 100. A motor-only mode may be useful in hybrid applications and/or during start-stop configurations (e.g., to prepare fluid in the circuit for start and stop), for example. In this mode, the electric motor source 34 only drives the second pump 40 by rotating the input shaft 36 and thus gears 26 and 28. Specifically, the motor power source 34 rotates the gear 26 in its pumping direction via the shaft 36 transferring its rotation through the one-way bearing 24. Gear 28 is rotated in its opposite pumping direction by intermeshed teeth, and one-way bearing 30 allows that rotation to occur freely without transferring rotation to the connecting shaft 22. The ICE source 20 is off (not running) and the first pump 10 is inactive and held in a stopped position. The motor source 34 is driven at a speed to output fluid from the outlet 41 of the housing 38. There is no displacement from the first pump 10, and displacement from the second pump 40 is proportional to the drive speed of the motor source 34.

Figure 4:
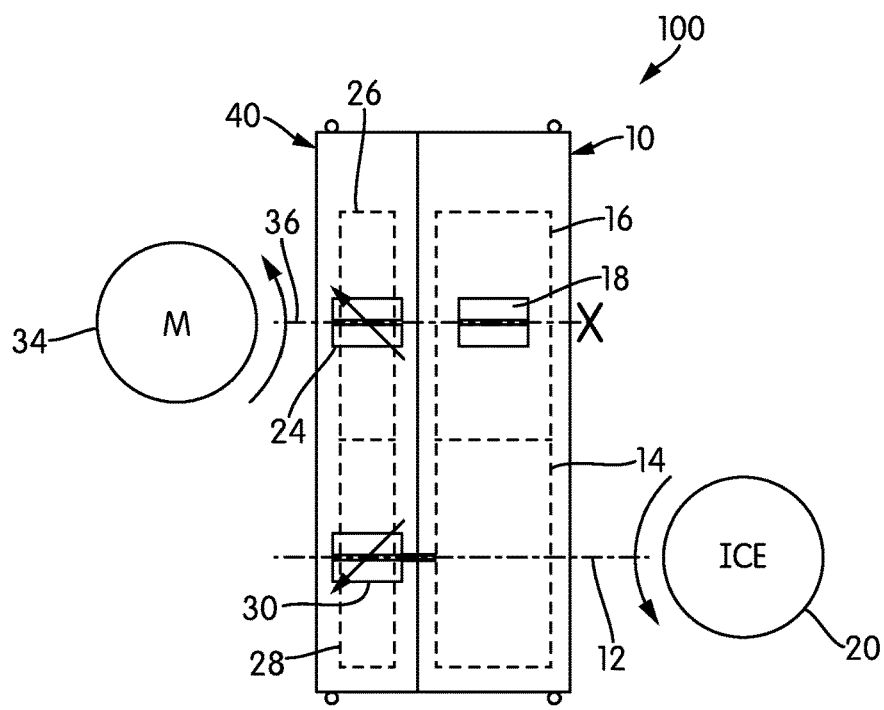
FIG. 4 is a schematic illustration of the system of FIG. 1 operating in a third mode in accordance with an embodiment.

FIG. 4 schematically shows the system 100 when implemented in a combined mode (e.g., a combined engine and motor mode). As should be understood by the description below, the combined mode enables higher displacement from the pump system 100 by utilizing on demand augmentation by electric motor source 34 and second pump 40. The electric motor source 34 can be continuously synchronized to pump speed for a fast reaction and dynamic response to increase flow and boost pressure. Such a combined mode may be desirable, for example, for fast filling of clutches or passages, e.g., before and/or during a clutch shift, or as a fast response to a variable valve timing phase for an engine. The combined mode may be used a higher temperature flow and pressure of fluid or lubricant is desired, where displacement solely from pump 10 is deficient.

In the combined mode, the ICE source 20 drives the first pump 10 via the input shaft 12 in the same manner as the engine-only mode: drive gear 14 is rotated in its pumping direction using the input shaft 12, which in turn rotates gear 16 via intermeshing with gear 14. The driven gear 16 of first pump 10 freely rotates on its bearing 18. However, instead of using the connecting shaft 22 to operate the second pump 40, the electric motor source 34 is used to drive the motor input shaft 36 and gears 26 and 28. In particular, the electric motor source 34 drives the second pump 40 at a faster rate than the ICE source 20 would. This allows for an increase of overall displacement from the pump system 100 (i.e., increased displacement of fluid from both pumps 10 and 40). Specifically, the motor source 34 overspeeds and engages the one-way clutch bearing 24 of gear 26 to thereby drive gear 26 in its pumping direction, which in turn drives gear 28 in its opposite pumping direction via intermeshing. The use of the one-way clutch bearing 30 with gear 28 allows the motor source 34 to rotate gear 28 (via driving gear 24) in its opposite pumping direction at a faster rate as compared to the rotation of the connecting shaft 22. Specifically, the one-way clutch bearing 30 allows the second pump 40 to pump and displace fluid without resistance from the ICE source input, because the bearing 30 allows the gear 28 to rotate in its opposite pumping direction around the connecting shaft 22 (even as the connecting shaft 22 is rotated). Displacement from the first pump 10 is proportional to the speed of the ICE source 20, whereas displacement from the second pump 40 is proportional to the motor speed (overspeed).

Figure 5:
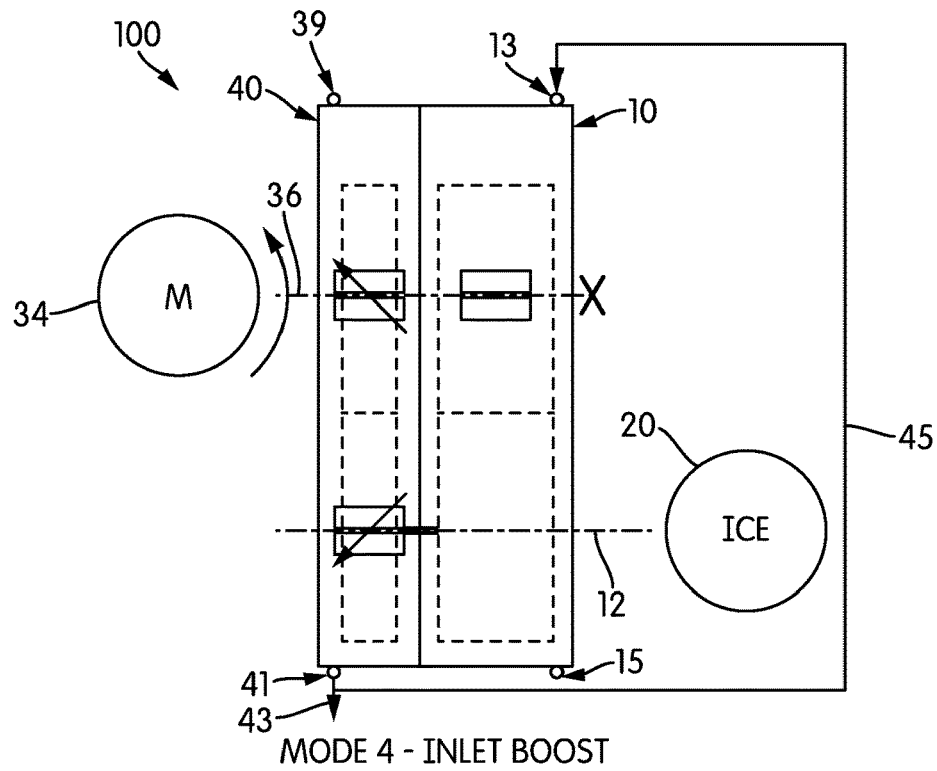
FIG. 5 is a schematic illustration of the system of FIG. 1 operating in a fourth mode in accordance with an embodiment.

In an inlet boost mode of system 100, which is schematically shown in FIG. 5, the pumps 10, 40 are operated in the same manner as the combined mode. In addition, at least some of the outlet flow 43 from outlet 41 of the second pump 40 is directed to the inlet 13 of the first pump 10 via path 45 in order to boost or increase the flow of fluid into pump 10. By activating the second pump 40 at higher engine rpms, for example (e.g., 3500-400 rpms), the output flow pressure may be increased, and this pressurized flow is directed to the first pump 10. Boosting the input fluid into pump 10 improves the input flow rate of fluid and aids in eliminating potentially harsh effects of cavitation and aeration (since slightly increased inlet pressure has been determined to reduce or solve cavitation effects in pumps).

Figure 6:
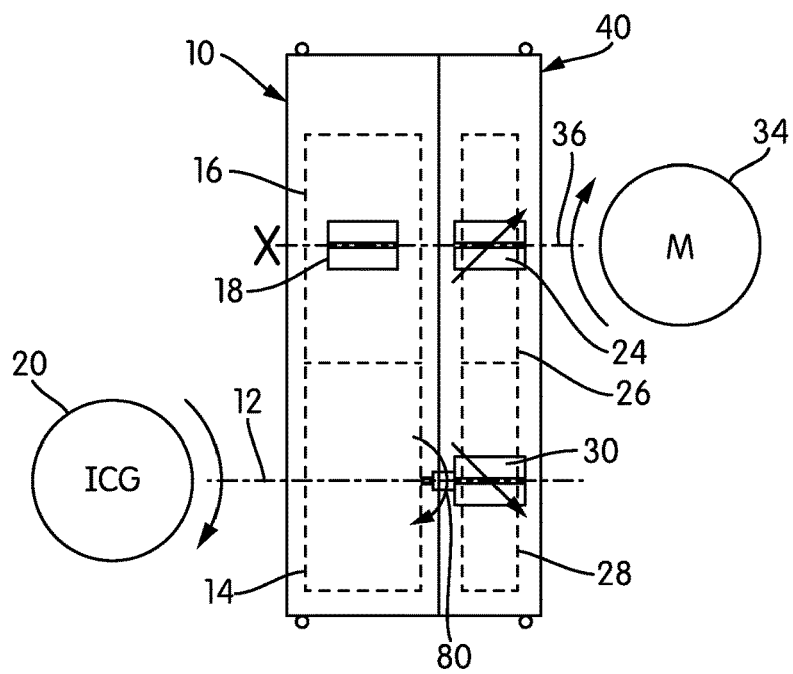
FIG. 6 is a schematic illustration of the system of FIG. 1 operating in a fifth mode in accordance with an embodiment.

FIG. 6 schematically shows an additional embodiment of the system 100 as for implementing a disconnection mode. Specifically, FIG. 6 shows an additional connector 80 provided on the connecting shaft 12 between the first pump 10 and the second pump 40, operationally connecting the pumps to one another. The connector 80 may be an electronically controlled two-way clutch bearing, for example. In one embodiment, the connector 80 enables at least temporary decoupling or disconnection of the first pump 10 from the second pump 40. This reduces the overall pump capacity from the pump system 100 when it is not needed, for example. The ICE source 20 continues to drive pump 10, while pump 40 is disconnected therefrom, but the second pump 40 may be reconnected via connector 80 at any desirable or required moments (e.g., via command from an ECU/controller). Generally, output flow from the system 100 is higher when the pumps 10, 40 are connected and both operating. The flow and pressure at idling point is executed by the first and second pumps 10, 40 together. However, in certain cases, such as at times during idling, the designated system, e.g., ICE source 20 or transmission, does not require all of the combined output flow. The displacement from the first pump 10 provides enough flow and capacity to send to the designated system during the time period that the pumps 10 and 40 are disconnected. For example, at elevated speed, there will be an overflow. Accordingly, by temporarily disconnecting the second pump 40 from the first pump 10 via connector 80, resulting in only periodic or little to zero flow from the second pump 40, this disconnection mode allows for avoidance of overflow and reduces energy used by the system 100. Further, the disconnection mode may be implemented based on alert from other systems or sensors associated with the pump system 100, such as a PWM system.

A PWM valve/system may be used to add some flow and pressure to its circuit so that the second pump 40 may be immediately ready when needed and reconnected to the first pump 10.

Additionally, in accordance with another embodiment, although the second pump 40 is disconnected from the first pump 10 (by disconnecting connector 80 on shaft 12), the motor 34 may be used to drive second pump 40. The second pump 40 may thus be driven at a different speed than the first pump 10. Still, even in such a case, the pump capacity from the system 100 is reduced.

Figure 7:
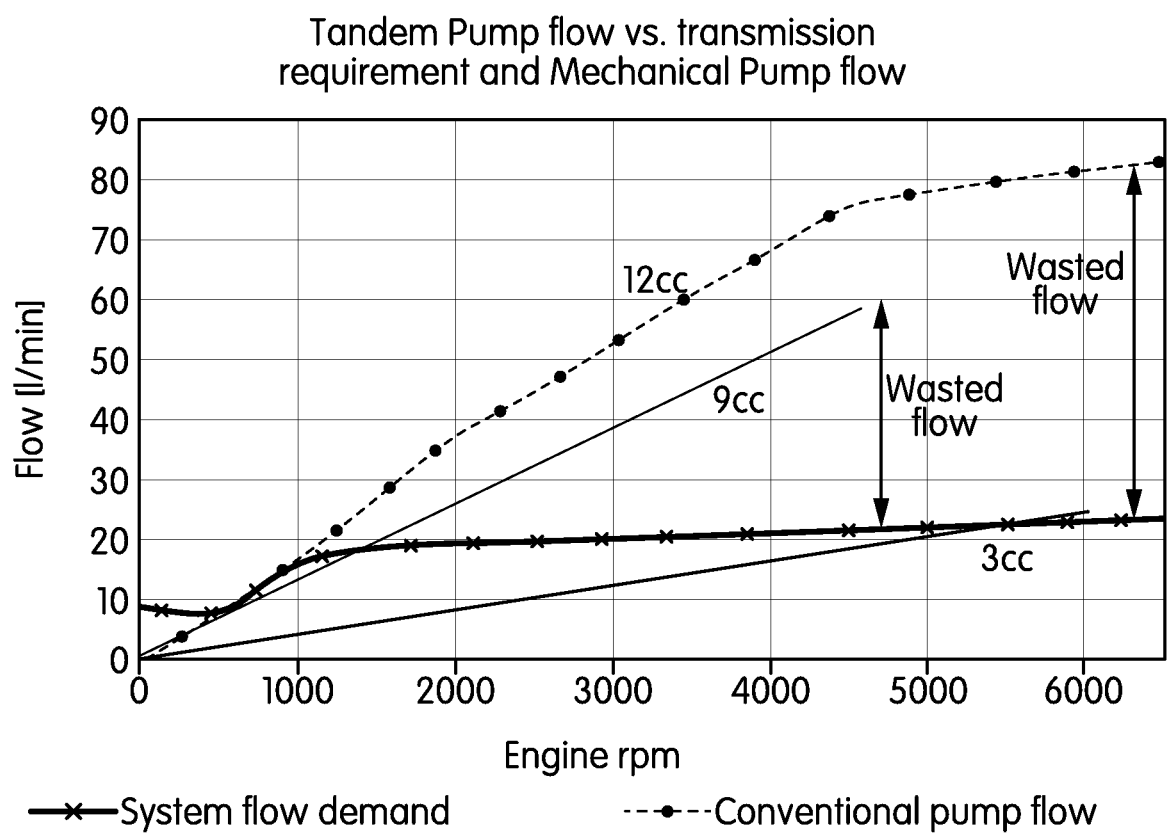
FIG. 7 is a graph illustrating flow demands of a pump system as disclosed herein versus conventional pump flow, and saved excess flow.

The flow chart in FIG. 7 illustrates an example of the flow rate v. engine rpm for conventional tandem/combined pump flow as well as the flow demand by the system. Although the system flow demand remains relatively steady (e.g., at or around approximately 20 l/min) as the engine speed increases, FIG. 7 shows that conventional pump flow typically grows exponentially along with the speed. Typically, some of the extra output flow (i.e., the difference in flow v. demand) may be redirected to a sump or tank, but a large amount of this output flow potentially becomes wasted flow. Accordingly, to compensate for the difference in flow v. demand and to save or reduce excess or wasted flow, the output flow and pressure of fluid (e.g., lower flow and/or pressure) may be altered for a period of time by implementing the above disconnection mode (with or without the second pump 40 running, the second pump 40 is still decoupled from the first pump 10). As represented by the arrows in FIG. 7, for example, the difference in potential wasted flow when both pumps 10, 40 are connected for output (e.g., at 12 cc) as compared to when the pumps 10, 40 are disconnected (e.g., output at 9 cc for first pump 10 and 3 cc for second pump 40) is reduced.

Optionally, one or more speed controlled valves (not shown) may be provided with system 100 to control operation of the ICE source 20, motor 34, and the pumps and the noted modes described herein.

Accordingly, as understood by the modes described above, the disclosed pump system 100 supports implementing both high and lower pressure circuits within the pump system 100 in order to adjust the overall pump displacement. Additionally, the use of the one-way clutch bearings within the gears as disclosed herein provides a more compact packaging (as compared to known systems with clutches typically provided outside the pump). This packaging allows the pump system 100 to be placed in a smaller space while still allowing the system to be driven by dual inputs.

Figure 8A:
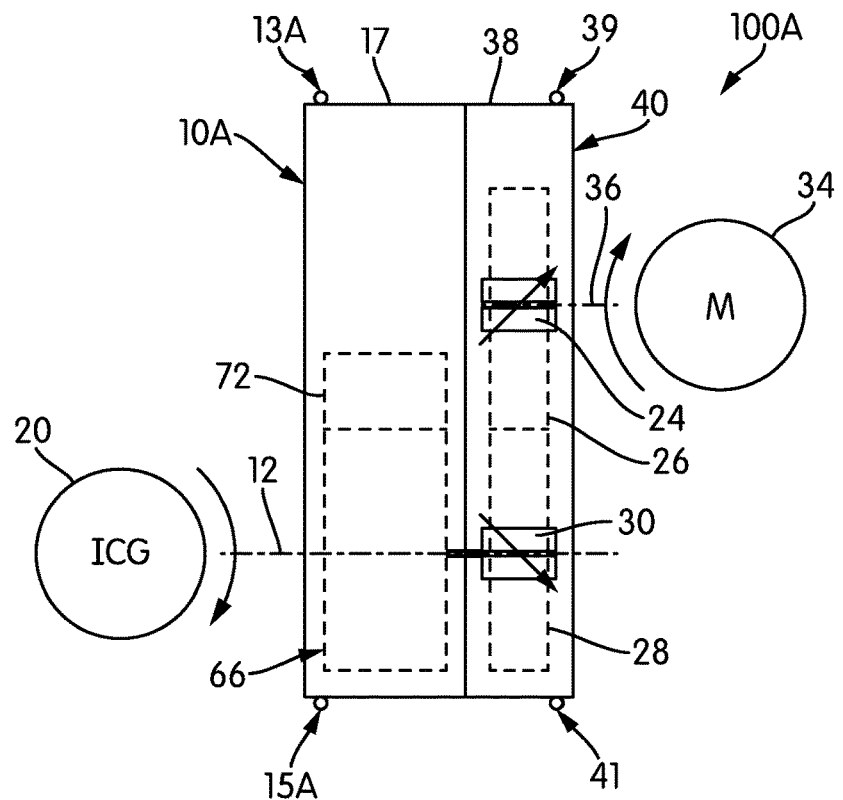
FIG. 8A is a schematic illustration of a dual input fluid pump system in accordance with another embodiment of this disclosure.

As previously mentioned, in an embodiment, at least one of the pumps 10, 40 in the pump system may be a gerotor-type pump. FIG. 8A shows a dual input fluid pump system 100A having a first pump 10A including a gerotor-type unit as its rotatable pumping element along with the second pump 40. Like system 100, the pump system 100A is coupled to both internal combustion engine power source 20 and an electrical motor power source 34. As depicted schematically in FIG. 1, the second pump 40 is configured to be driven directly by the electrical motor power source 34 in a similar manner as previously described, whereas the gerotor pump 10A is configured to be driven directly by the internal combustion engine power source 20. Since parts of the second pump 40 in pump system 100A are the same as previously described with reference to pump system 100 (e.g., gears 26, 28 are provided in housing 38, along with one-way clutch bearings 24 and 30), the same reference numerals are used in FIG. 8A to note such features, and thus the description is not repeated here.

Figure 8B:
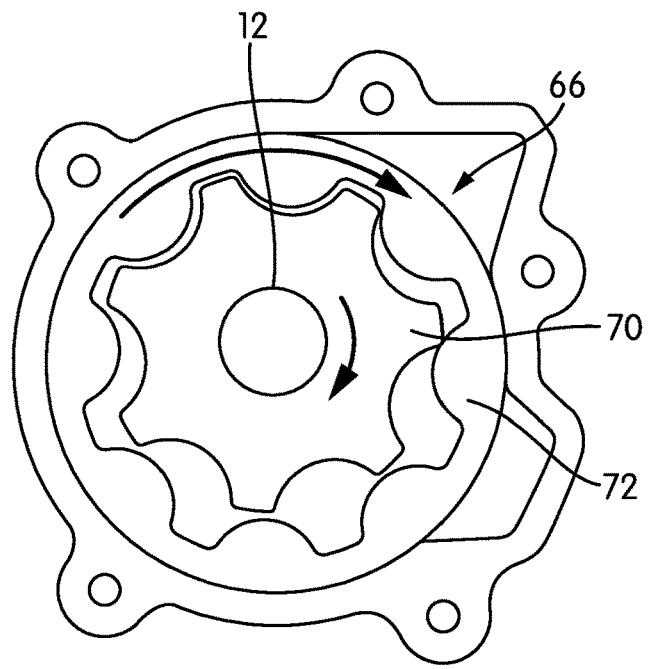
FIG. 8B is a schematic illustration of gears in a gerotor type pump and housing that may be used in the system of FIG. 8A in accordance with an embodiment of this disclosure.

The first pump 10A includes a gerotor unit 66 provided in a housing 17. The pump housing 17 has an inlet 13A and an outlet 15A. The inlet 13A receives fluid or inputs lubricant to be pumped from a source (e.g., sump) into the housing 17, and the outlet 15A is used for discharging or delivering the pressurized fluid or lubricant to a designated system from the housing 17. The gerotor unit 66 acts as a drive source for the first pump 10A. The gerotor unit 66 may be an existing unit or designed for space constraints. As understood by one of ordinary skill in the art, the gerotor unit 66 is a positive displacement unit that includes an inner rotor 70 and outer rotor 72, an example of which is schematically shown in FIG. 8B. The inner rotor 70 has N teeth, and the outer rotor 72 has N+1 teeth, with N defined as a number greater than 2. The inner rotor 70 is a drive gear that is rotated relative to outer rotor 72 so that its teeth are moved into the teeth of the outer rotor 72. In accordance with an embodiment, the input shaft 12 is connected to the inner rotor 70 of the gerotor unit 66 thereby coupling the internal combustion engine (ICE) power source 20 to the drive source of first pump 10A. The ICE source 20 is configured to rotate the shaft 12 which in turn rotates inner rotor 70 (e.g., in a clockwise direction) relative to outer rotor 72. Fluid travels between the teeth of the gears/rotors and is pressurized therebetween before being discharged.

Figure 15:
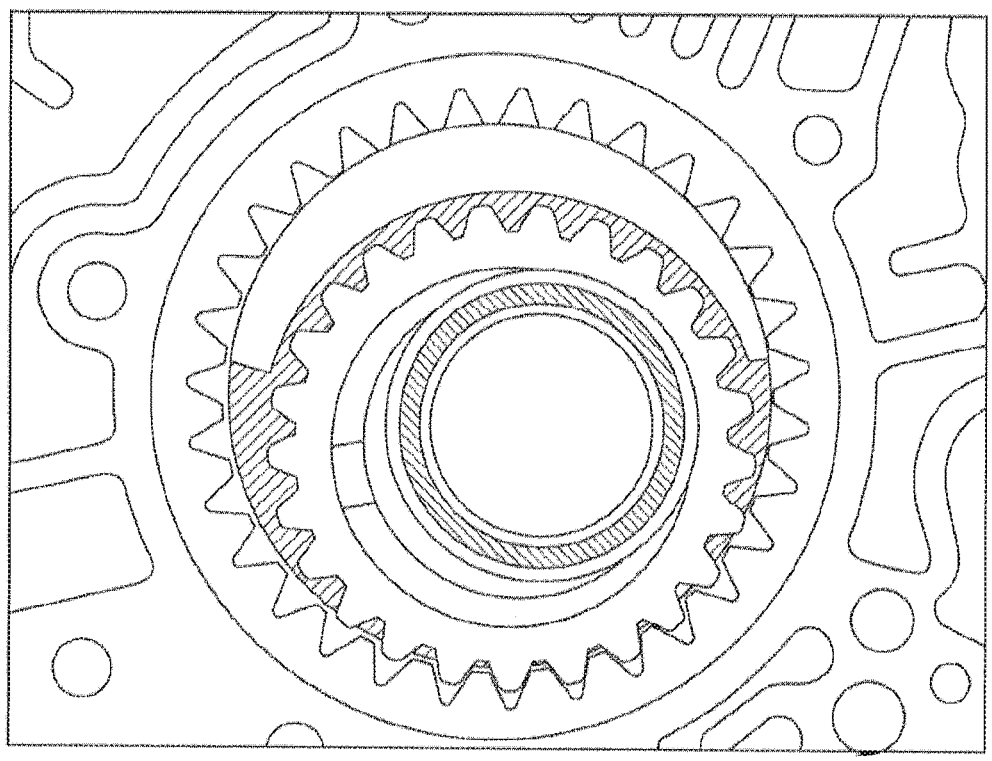
FIG. 15 is a schematic illustration of gears in a crescent internal gear pump and housing that may be used in the system of FIG. 8A in accordance with yet another embodiment of this disclosure.

In another embodiment, as previously noted, at least one of pumps 10 and 40 is an internal gear pump. For example, FIG. 15 shows an example of parts of a crescent internal gear (CIG) pump within a housing that may be used for pump 10 and/or 40, wherein a crescent shaped gear and spur gear are provided inside or internal to a ring gear and configured to move within and around the outside ring gear (i.e., the crescent and spur gear move in a similar fashion to an inner rotor of the gerotor pump shown in FIG. 8B). As an example, the first pump 10A of FIG. 8A may include a crescent pump unit as the rotatable pumping element, along with the second pump 40, that is coupled to both internal combustion engine power source 20 and an electrical motor power source 34. Generally, the crescent pump may be driven in a similar manner as the above described gerotor pump; for example the internal spur gear may be rotatably mounted in the outer ring gear for rotation in a pumping direction to pump fluid from the inlet to the outlet through the housing, i.e., using ICE source 20, rotating and moving the spur gear and crescent shaped gear relative to the ring gear so that its teeth are moved into the teeth of ring gear and pressurizing fluid between the teeth of the gears/rotors before being discharged. Accordingly, further details are not reiterated here.

Figure 16:
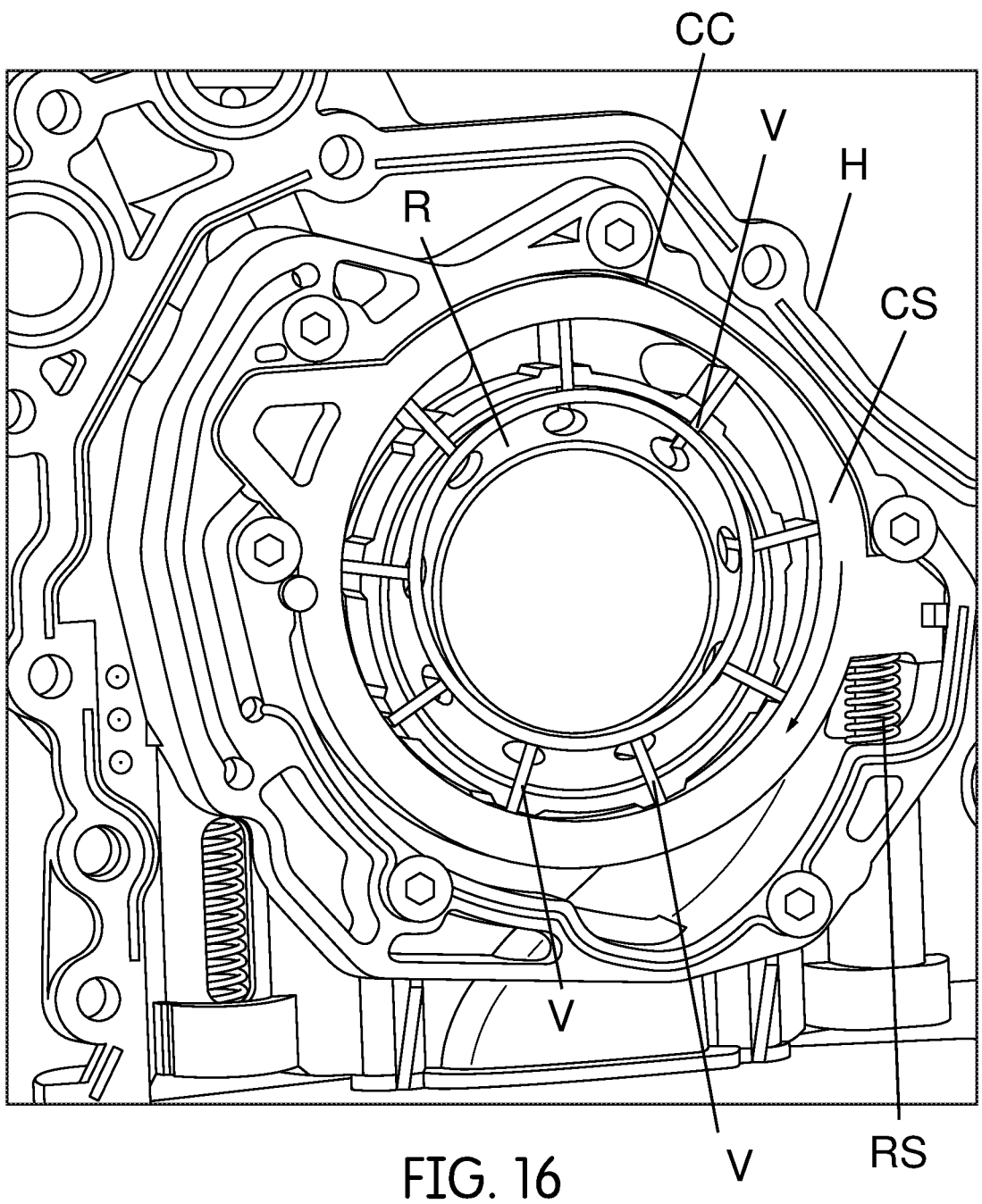
FIG. 16 is a schematic illustration of parts of a variable vane pump and housing that may be used in the system of FIG. 8A in accordance with still yet another embodiment of this disclosure.

Alternatively, as previously mentioned, at least one of the pumps 10, 40 in the pump system 100 may be a variable vane-type pump in accordance with embodiments herein. FIG. 16 shows one example depiction of some of the parts in a variable vane pump. As generally understood by one of ordinary skill in the art, a variable vane pump may include a housing H, an inlet for inputting lubricant from a source into the housing, and an outlet for delivering pressurized lubricant to the system from the housing. A control slide CS that is displaceable within the housing between a first slide position (e.g., for maximum pump displacement) and a second slide position (e.g., for a reduced displacement and/or minimum pump displacement) to adjust displacement of the pump through the outlet is also provided in such a pump. A resilient structure RS or spring may bias the control slide towards the first slide position, for example. A rotor R with one or more vanes V is mounted in the housing and configured for rotation within and relative to the control slide CS. The vane(s) V are configured for engagement with an inside surface of the control slide during rotation thereof. One or more control chambers CC may be provided between the housing H and the control slide CS for receiving pressurized lubricant to move or displace the control slide towards the second position. U.S. Pat. Nos. 9,109,597 and 9,534,519, each which are hereby incorporated by reference in their entireties, provide examples of vane pumps that may be used as a pump (e.g., first pump 10) as part of the dual input fluid system 100. As an example, the first pump 10A of FIG. 8A may be a variable vane pump unit acting as the rotatable pumping element, along with the second pump 40. Like system 100 or system 100A, the second pump 40 may be configured to be driven directly by the electrical motor power source 34 in a similar manner as previously described, whereas the variable vane pump 10A is configured to be driven directly by the internal combustion engine power source 20. In accordance with an embodiment, the input shaft 12 may be connected to drive the rotor of the pump, thereby coupling the internal combustion engine (ICE) power source 20 to the drive source of first pump 10A. The ICE source 20 is configured to rotate the shaft 12 which in turn rotates the rotor in the receiving space of the control slide and moves the vane(s) into engagement with the inside surface of the slide. Operation of such a vane pump is generally known and thus not further described. It is understood, however, that during operation of such a variable vane pump, a variable or adjustable output flow from the first pump 10A may be provided to the associated system based on the position of the control slide within the housing, for example.

The pump system 100A is also designed to operate in multiple modes, such as those described above with reference to FIGS. 2-6, thereby implementing both high and lower pressure circuits in order to adjust the overall pump displacement. For purposes of simplicity only, each of the modes is not re-described herein. However, it should be understood that in accordance with an embodiment, the pump system 100A may be operated in different modes—e.g., (1) an engine-only mode, (2) a motor-only mode, (3) a combined mode, (4) an inlet boost mode (optional), and (5) a disconnection mode (optional), as described above.

Again, the use of the one-way clutch bearings within the gears of pump 40 provides a more compact packaging (as compared to known systems with clutches typically provided outside the pump). Further, the packaging and housing of the gerotor-type unit 66 as part of first pump 10A may be smaller than external gears, and thus the system 100A may be placed in an even smaller space while still allowing the system to be driven by dual inputs.

In one embodiment, the displacement of the first pump 10 is driven at a 3:1 ratio relative to the displacement of the second pump 40. For example, the first pump 10 may be driven to 9 cc (per revolution), and the second pump 40 may be driven at 3 cc (per revolution). However, this ratio may be altered based on the system to which fluid is output.

Figure 10:
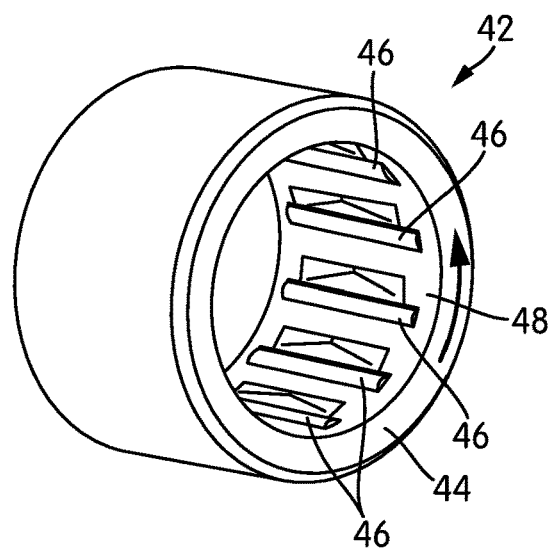
FIG. 10 shows an example of a one-way needle roller bearing that may be used in gears in embodiments of this disclosure.
Figures 11, 12:
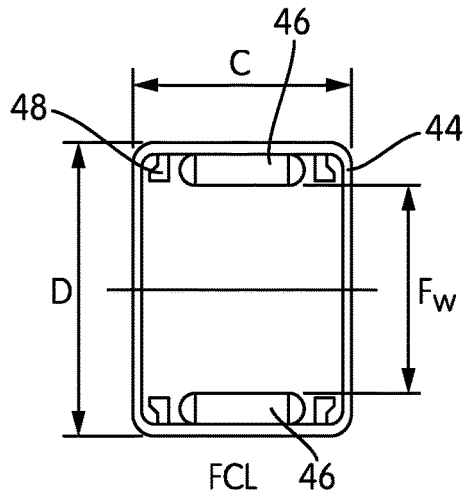
FIG. 11 is a cross-sectional view of the one-way bearing of FIG. 10 in accordance with an embodiment.
FIG. 12 shows examples of dimensions for one-way needle bearings as referenced with respect to FIG. 11 in accordance with an embodiment.

In one embodiment, the one-way clutch bearings 24, 30 are a one-way needle roller bearing 42 shell type, such as shown in FIG. 10. A needle roller bearing 42 includes a housing 44 (and/or cage) having number of smaller cylindrical rollers 46 mounted within a wedge 48 therein, forming a clutch. The rollers 46 of the clutch are positioned around and parallel to the axis of the shaft which the bearing is mounted on, as shown in FIG. 10 and the cross-sectional view of FIG. 11. FIG. 12 shows exemplary dimensions related to different sizes of needle roller bearings (the dimensions being noted in FIG. 11) which may be utilized with the gears 26, 28 of system 100 in some embodiments, for example. Of course, it should be noted that such numbers and dimensions are exemplary and are not intended to be limiting.

Figure 13A:
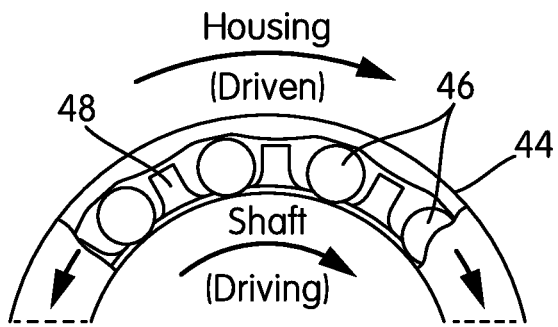
FIGS. 13A-13B and 14A-14B are partial schematic cross-sectional views of the bearing of FIG. 10 with a shaft, showing exemplary directions of rotation of both during different operating modes.
Figure 13B:
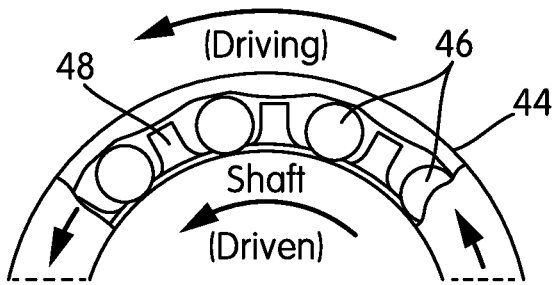

FIGS. 13A-13B and 14A-14B are partial schematic cross-sectional views of the one-way needle bearing 42 of FIG. 10 with a shaft (e.g., connecting shaft 22, or motor input shaft 36), showing operation and directions of rotation of the bearing 42 and shaft during different operating modes. FIGS. 13A and 13B illustrate examples of the one-way needle bearing 42 being engaged with a shaft. The force of the spring mounted inside the clutch, which is produced by the relative rotation of the clutch bearing and the shaft mounted to the housing, causes the rollers 46 to contact the wedge 48 face and engage it. When the clutch is engaged, the engagement directions are opposite depending on whether the shaft or housing is driven. For example, FIG. 13A shows an example of the bearing (and thus the gear associated with it) engaged with the shaft and being driven in the driving direction of the shaft, e.g., in a clockwise direction as shown in FIG. 13A, as the shaft is being driven by a power source (e.g., ICE source 20 or motor source 34). FIG. 13B shows an example of the bearing engaged with the shaft and causing the driving (e.g., because the gear associated with it is being driven), thus driving the shaft, e.g., in a counter-clockwise direction as shown in FIG. 13B.

Figure 14A:
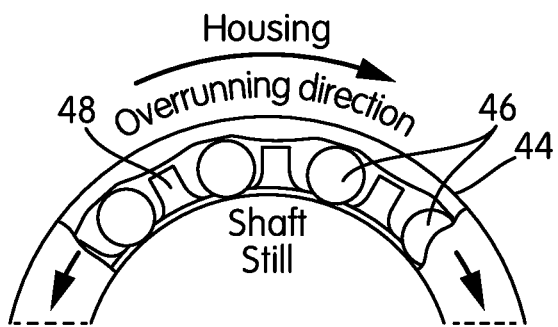
Figure 14B:
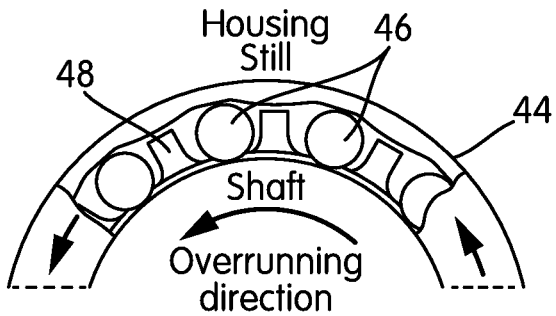

FIGS. 14A and 14B illustrate examples of when the clutch of the one-way needle bearing 42 is overrun (and thus is disengaged from mutual rotation with the shaft). With the relative rotation of the clutch and the shaft mounted to the housing (e.g., opposite), the rollers 46 operate freely and away from the wedge 48 face and overrun movement of the shaft. When the clutch is overrun, the housing and the clutch of the bearing may overrun in one direction, e.g., clockwise direction as shown in FIG. 14A, while the shaft remains substantially still or is overrun in the opposite direction (e.g., counter-clockwise direction). Similarly, in the alternative, the clutch of the bearing may be overrun such that the bearing remains substantially still as the shaft is overrun in an opposite direction (e.g., counter-clockwise direction), as illustrated in FIG. 14B.

Although the schematic illustration of FIG. 1 depicts the first pump 10 and the second pump 40 as having generally separate housings 11 and 38 (respectively), this is not intended to be limiting. In accordance with an embodiment, the housings 11 and 38 may be provided in the form of connected housings (e.g., through which there is fluid communication) or as a single housings. In one embodiment, a universal (e.g., outer) housing contains the pumps 10 and 40. The housings 11, 38 may be made of any material, and may be formed by aluminum die cast, powdered metal forming, forging, or any other desired manufacturing technique.

Figure 9:
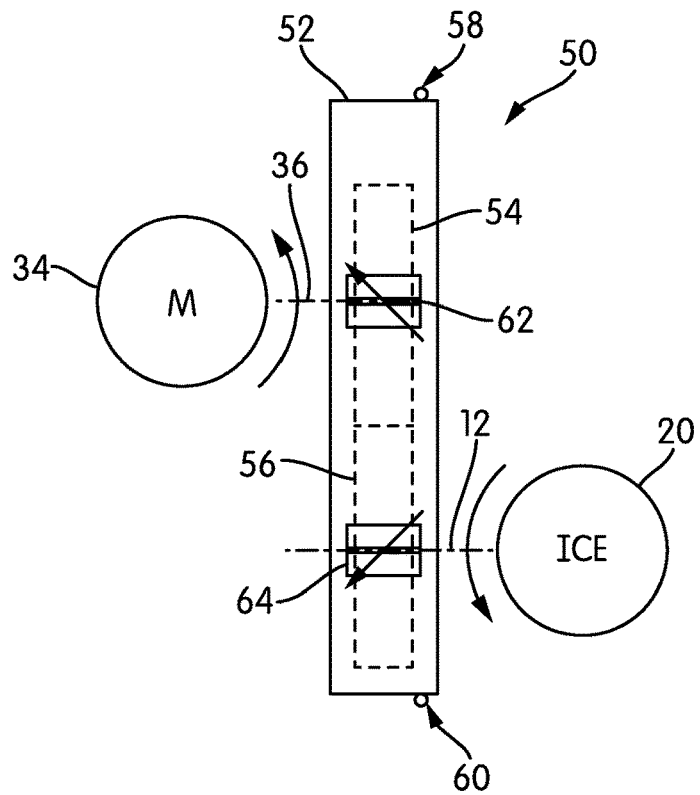
FIG. 9 is a schematic illustration of a dual input fluid pump in accordance with yet another embodiment of this disclosure.

FIG. 9 shows a dual input fluid pump 50 in accordance with another embodiment of this disclosure. The pump 50 is coupled to both an internal combustion engine power source 20 and an electrical motor power source 34. The pump 50 is a single, external gear pump that includes gears 54, 56 inside its housing 52. The gears 54, 56 and are intermeshed and mounted within the housing 52. The pump housing 52 has an inlet 58 and an outlet 60. The inlet 58 receives fluid or inputs lubricant to be pumped (typically oil in the automotive context) from a source (e.g., sump) into the housing 52, and the outlet 60 is used for discharging or delivering the pressurized fluid or lubricant to a designated system from the housing 52. The rotation and meshing of the gears 54, 56 in their counter-rotating pumping directions moves and displaces fluid to the outlet 60 of the pump.

As depicted in FIG. 9, gear 56 is configured to be driven by the internal combustion engine source 20 and gear 54 is configured to be driven by the electrical motor source 34. An input shaft 12 is connected to the gear 56 and couples the internal combustion engine (ICE) power source 20 thereto. In some modes, the ICE source 20 is configured to rotate the shaft 12 (e.g., counterclockwise as shown in FIG. 9) which in turn rotates and drives gear 56. An input shaft 36 is also connected to the gear 54 and couples the electrical motor power source (M) 34 to the gear 54. In some modes, the motor source 34 is configured to rotate the shaft 36 which in turn rotates gear 54. The gears 54, 56 are rotated in a counter-rotating pumping direction to pump fluid from the inlet 58 to the outlet 60 through the housing 52.

Each of the external gears 54, 56 of the pump 50 includes a one-way clutch bearing therein. Gear 54 includes a first one-way clutch bearing 62 and gear 56 includes a second one-way clutch bearing 64. The one-way clutch bearing 62 receives the motor input shaft 36 that is connected to the drive gear 54. The one-way clutch bearing 62 is configured to both (a) transmit rotation of the input shaft 36 to the gear 54 for rotation in the pumping direction thereof, and (b) prevent rotation of the gear 54 in the pumping direction thereof from being transmitted to the input shaft 36. The one-way clutch bearing 64 of the gear 56 receives the input shaft 12 of the ICE source 20. The one-way clutch bearing 64 is configured to both (a) transmit rotation of the input shaft 12 to the gear 56 for rotation in the pumping direction thereof, and (b) prevent rotation of the gear 56 in the pumping direction thereof from being transmitted to the input shaft 12. Bearing 64 thus functions the same as bearing 62, but is arranged in the opposite manner.

Further, the one-way clutch bearings 62 and 64 enable the pump 50 to be operated in different modes—e.g., (1) an engine-only mode, (2) a motor-only mode, and (3) an overdrive mode. In the pump's engine-only mode, the ICE source 20 acts as the primary drive to operate the pump 50 via the input shaft 12. The electric drive motor source 34 is off and not running. The ICE source 20 rotates the input shaft 12 to rotate gear 56 in its pumping direction via one-way clutch bearing 64, and gear 56 in turn drives gear 54 in its opposite pumping direction via intermeshing. The one-way bearing 22 allows gear 54 to rotate in its pumping direction freely over shaft 36 without back-driving against the electric motor power source 34. Displacement from the pump 50 is proportional to the drive speed of the ICE source 20.

In the pump's motor-only mode, the motor source 34 acts as the primary drive to operate the pump 50 via the input shaft 36. The electric motor source 34 rotates the input shaft 36 to rotate gear 54 in its pumping direction via one-way clutch bearing 62, and hear 54 in turn drives gear 56 in its opposite pumping direction via intermeshing. The ICE source 20 is off (not running). The motor source 34 is driven at a speed to output fluid from the outlet 41 of the housing 38. The one-way clutch bearing 64 allows gear 56 to rotate in its pumping direction freely over shaft 12 without back-driving against the ICE power source 20. Displacement from the pump 50 is proportional to the drive speed of the motor source 34.

In the pump's overdrive mode, the motor source 34 operates the pump 50 via its input shaft 36 at a faster rate than the input shaft 12 being rotated by the engine/ICE source 20. The overdrive mode enables higher displacement from the pump 50 by utilizing on demand augmentation by electric motor source 34. The electric motor source 34 can be continuously synchronized to pump speed for a fast reaction to increase flow and boost pressure. Specifically, in the overdrive mode, the ICE source 20 rotates the input shaft 12 in the pumping direction for driving gear 56. However, the electric motor source 34 is also used to drive the motor input shaft 36 and gear 54 in its pumping direction, and it does so at a rate that in turn drives the gear 56 in its pumping direction at a rate higher than the rotation rate of the shaft 12. The use of the one-way clutch bearing 64 with gear 56 allows gear 56 to be rotated in its pumping direction by motor-driven gear 54 at a faster rate than it would be otherwise rotated by the input shaft 12 and ICE source 20. Displacement from the pump 50 is proportional to the motor speed or engine speed, whichever is driving the gears the fastest.

In one embodiment, the one-way clutch bearings 62, 64 are of a one-way needle roller bearing shell type, such as shown in FIG. 10, and previously described above with reference to FIGS. 13A-14B.

Accordingly, the use of the one-way clutch bearings within the gears and within a single pump 50 as disclosed herein provides a more compact packaging (as compared to known systems with clutches typically provided outside the pump). This packaging allows the pump 50 to be placed in a smaller space while still allowing it to be driven by dual inputs.

The designated system in which the output flow from outlets 15, 41 is directed is not intended to be limiting. For example, it may be the engine, motor, a transmission, or other devices (some of which may be noted throughout this description).

Also, although not specifically noted throughout this disclosure, it should be understood to one of ordinary skill in the art that a number of systems, including one or more controllers, sensors, or valves, may be used with system 100. A controller may be designed to electrically signal and control the herein described clutch bearings, for example, and the ICE source 20 and motor 34. Additional seals, solenoids, and/or other devices may also be used in the system.

Although not shown, any number of seals can be associated with the housings 11, 38, and/or 52, such as seals in the form of rings for surrounding a shaft or seals to cooperate with a cover on a housing.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A dual input fluid pump system for coupling to a transmission or an internal combustion engine power source and an electrical motor power source, the pump system comprising:
    a first pump comprising a housing, a rotatable pumping element rotatably mounted in the housing, an inlet, an outlet, and a first input shaft for coupling the transmission or internal combustion engine power source to the rotatable pumping element thereof for rotating the rotatable pumping element in a pumping direction to pump fluid from the inlet to the outlet through the housing;
    a second pump that is an external gear pump comprising a housing, at least first and second intermeshed external gears rotatably mounted in the housing, an inlet, an outlet, and a second input shaft for coupling the electrical motor power source to the second external gear thereof for rotating the gears in counter-rotating pumping directions to pump fluid from the inlet to the outlet through the housing; and
    a connecting shaft between the rotatable pumping element of the first pump and the first external gear of the second pump, the connecting shaft being rotated in the pumping direction of the rotatable pumping element of the first pump as rotated by the transmission or the internal combustion engine power source;

wherein each of the external gears of the second pump includes a one-way clutch bearing therein, the one-way clutch bearing of the first external gear of the second pump receiving the connecting shaft and being configured to (a) transmit rotation of the connecting shaft to the first external gear of the second pump for rotation in the pumping direction thereof, and (b) prevent rotation of the first external gear of the second pump in the pumping direction thereof from being transmitted to the connecting shaft, the one-way clutch bearing of the second external gear of the second pump receiving the second input shaft thereof and being configured to (a) transmit rotation of the second input shaft of the second pump to the second external gear of the second pump for rotation in the pumping direction thereof, and (b) prevent rotation of the second external gear of the second pump in the pumping direction thereof from being transmitted to the second input shaft of the second pump, wherein the one-way clutch bearings enable the pump system to be operated in at least three modes including (a) an engine-only mode in which the transmission or the internal combustion engine power source operates the first pump via the first input shaft of the first pump and the second pump via the connecting shaft between the rotatable pumping element of the first pump and the first external gear of the second pump, (b) a motor-only mode in which the electrical motor power source only operates the second pump, and (c) a combined mode in which the transmission or the internal combustion engine power source operates the first pump via the first input shaft and the electrical motor power source operates the second pump with the first external gear thereof rotating in its pumping direction at a rate greater than the connecting shaft, further comprising an electronically controlled clutch bearing provided on the connecting shaft between the first pump and the second pump, the electronically controlled clutch bearing enabling the pump system to be operated in (e) a disconnection mode, in which the connecting shaft is prevented from rotating the first external gear of the second pump in the pumping direction thereof.

2. The pump system according to claim 1, wherein the first pump is an external gear pump comprising first and second intermeshed external gears rotatably mounted in the housing for rotation in counter-rotating pumping directions to pump fluid from the inlet to the outlet through the housing, and wherein the rotatable pumping element of the first pump is the first external gear thereof.

3. The pump system according to claim 1, wherein the connecting shaft and the first input shaft of the first pump are each sections of a common shaft extending through the rotatable pumping element of the first pump and the first external gear of the second pump.

4. The pump system according to claim 1, wherein the rotatable pumping element of the first pump comprises a gerotor unit, having an inner rotor rotatably mounted in an outer rotor in the housing, for rotation in counter-rotating pumping directions to pump fluid from the inlet to the outlet through the housing, and wherein the rotatable pumping element of the first pump is the inner rotor.

5. The pump system according to claim 1, wherein the rotatable pumping element of the first pump comprises at least an internal gear rotatably mounted in an outer ring gear within the housing for rotation in a pumping direction to pump fluid from the inlet to the outlet through the housing.

6. The pump system according to claim 1, wherein the first pump is variable vane pump, wherein the rotatable pumping element comprises a rotor, wherein the variable vane pump comprises: a control slide displaceable within the housing between a first slide position and a second slide position to adjust displacement of the pump through the outlet, a resilient structure biasing the control slide towards the first slide position, and a control chamber between the housing and the control slide for receiving pressurized lubricant to move the control slide towards the second position, wherein the rotor is configured for rotation within and relative to the control slide and the at least one vane is configured for engagement with an inside surface of the control slide during rotation thereof.

7. A dual input fluid pump system for coupling to a transmission or an internal combustion engine power source and an electrical motor power source, the pump system comprising:

a first pump comprising a housing, a rotatable pumping element rotatably mounted in the housing, an inlet, an outlet; and a first input shaft for coupling the transmission or internal combustion engine power source to the rotatable pumping element thereof for rotating the rotatable pumping element in a pumping direction to pump fluid from the inlet to the outlet through the housing;

a second pump that is an external gear pump comprising a housing, at least first and second intermeshed external gears rotatably mounted in the housing, an inlet, an outlet, and a second input shaft for coupling the electrical motor power source to the second external gear thereof for rotating the gears in counter-rotating pumping directions to pump fluid from the inlet to the outlet through the housing; and a connecting shaft between the rotatable pumping element of the first pump and the first external gear of the second pump, the connecting shaft being rotated in the pumping direction of the rotatable pumping element of the first pump as rotated by the transmission or the internal combustion engine power source;

wherein each of the external gears of the second pump includes a one-way clutch bearing therein, the one-way clutch bearing of the first external gear of the second pump receiving the connecting shaft and being configured to (a) transmit rotation of the connecting shaft to the first external gear of the second pump for rotation in the pumping direction thereof, and (b) prevent rotation of the first external gear of the second pump in the pumping direction thereof from being transmitted to the connecting shaft, the one-way clutch bearing of the second external gear of the second pump receiving the second input shaft thereof and being configured to (a) transmit rotation of the second input shaft of the second pump to the second external gear of the second pump for rotation in the pumping direction thereof, and (b) prevent rotation of the second external gear of the second pump in the pumping direction thereof from being transmitted to the second input shaft of the second pump;

wherein the one-way clutch bearings enable the pump system to be operated in (a) an engine-only mode in which the transmission or the internal combustion engine power source operates the first pump via the first input shaft of the first pump and the second pump via the connecting shaft between the rotatable pumping element of the first pump and the first external gear of the second pump, (b) a motor-only mode in which the electrical motor power source only operates the second pump, (c) a combined mode in which the transmission or the internal combustion engine power source operates the first pump via the first input shaft and the electrical motor power source operates the second pump with the first external gear thereof rotating in its pumping direction at a rate greater than the connecting shaft, and (d) an inlet boost mode, in which fluid from the outlet of the second pump is directed to the inlet of the first pump, and further comprising an electronically controlled clutch bearing provided on the connecting shaft between the first pump and the second pump, the electronically controlled clutch bearing enabling the pump system to be operated in (e) a disconnection mode, in which the connecting shaft is prevented from rotating the first external gear of the second pump in the pumping direction thereof.

8. The pump system according to claim 7, wherein the first pump is an external gear pump comprising first and second intermeshed external gears rotatably mounted in the housing for rotation in counter-rotating pumping directions to pump fluid from the inlet to the outlet through the housing, and wherein the rotatable pumping element of the first pump is the first external gear thereof.

9. The pump system according to claim 7, wherein the connecting shaft and the first input shaft of the first pump are each sections of a common shaft extending through the rotatable pumping element of the first pump and the first external gear of the second pump.

10. The pump system according to claim 7, wherein the rotatable pumping element of the first pump comprises a gerotor unit, having an inner rotor rotatably mounted in an outer rotor in the housing, for rotation in counter-rotating pumping directions to pump fluid from the inlet to the outlet through the housing, and wherein the rotatable pumping element of the first pump is the inner rotor.

11. The pump system according to claim 7, wherein the rotatable pumping element of the first pump comprises at least an internal gear rotatably mounted in an outer ring gear within the housing for rotation in a pumping direction to pump fluid from the inlet to the outlet through the housing.

12. The pump system according to claim 7, wherein the first pump is variable vane pump, wherein the rotatable pumping element comprises a rotor, wherein the variable vane pump comprises: a control slide displaceable within the housing between a first slide position and a second slide position to adjust displacement of the pump through the outlet, a resilient structure biasing the control slide towards the first slide position, and a control chamber between the housing and the control slide for receiving pressurized lubricant to move the control slide towards the second position, wherein the rotor is configured for rotation within and relative to the control slide and the at least one vane is configured for engagement with an inside surface of the control slide during rotation thereof.

* * * * *